United States Patent [19]

Demont

[11] Patent Number: 4,683,792
[45] Date of Patent: Aug. 4, 1987

[54] CUTTING APPARATUS

[76] Inventor: Allen Demont, 41 Valley Hill Dr., Holden, Mass. 01520

[21] Appl. No.: 704,773

[22] Filed: Feb. 25, 1985

Related U.S. Application Data

[63] Continuation-in-part of Ser. No. 576,484, Feb. 2, 1984.

[51] Int. Cl.⁴ .......................... B26F 3/12; B26D 1/553
[52] U.S. Cl. .......................................... 83/874; 83/16; 83/39; 83/46; 83/171; 83/426; 83/428; 83/433; 83/733; 83/71
[58] Field of Search ................. 83/171, 870, 874, 427, 83/428, 651.1, 433, 426, 16, 46, 39, 71, 733

[56] References Cited

U.S. PATENT DOCUMENTS 3,786,701  1/1974  Ludwig ................................. 83/427

FOREIGN PATENT DOCUMENTS 1437365 12/1966 France .................................. 83/171
 548727  9/1956 Italy ..................................... 83/171
0027730  2/1982 Japan .................................... 83/171

*Primary Examiner*—Donald R. Schran
*Attorney, Agent, or Firm*—Wolf, Greenfield & Sacks

[57]  ABSTRACT

An apparatus for cutting a foam block into a predetermined shape and comprising a frame having a table supported therein at a lower position of the frame. The table is driven in a horizontal plane at a controlled speed and there is provided at least one cutting hot wire. This hot wire is supported from the frame at a position over the table. A drive system is employed for driving the hot wire support means in a vertical direction at a controlled speed.

16 Claims, 23 Drawing Figures

Fig. 4

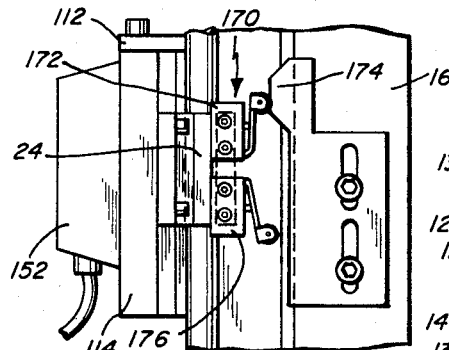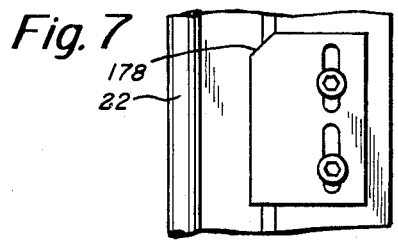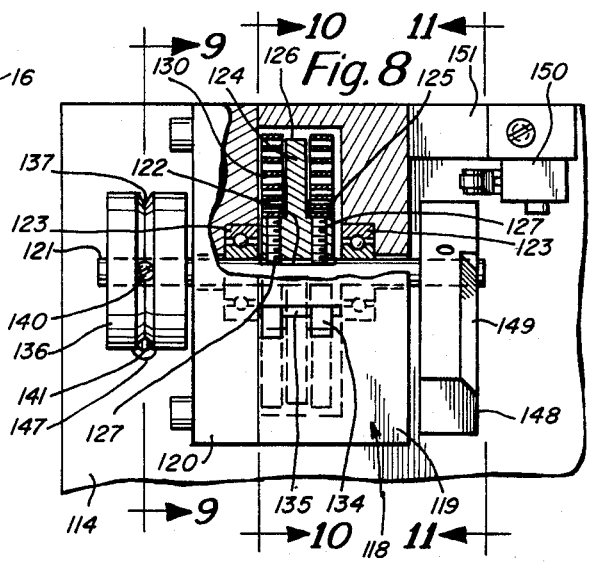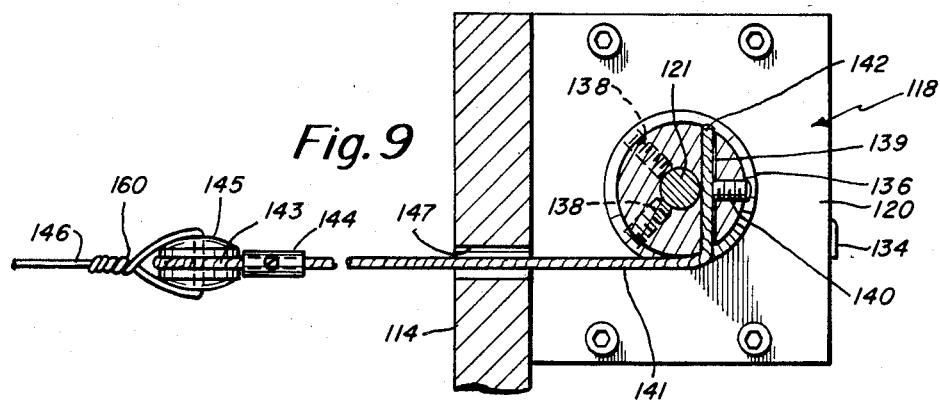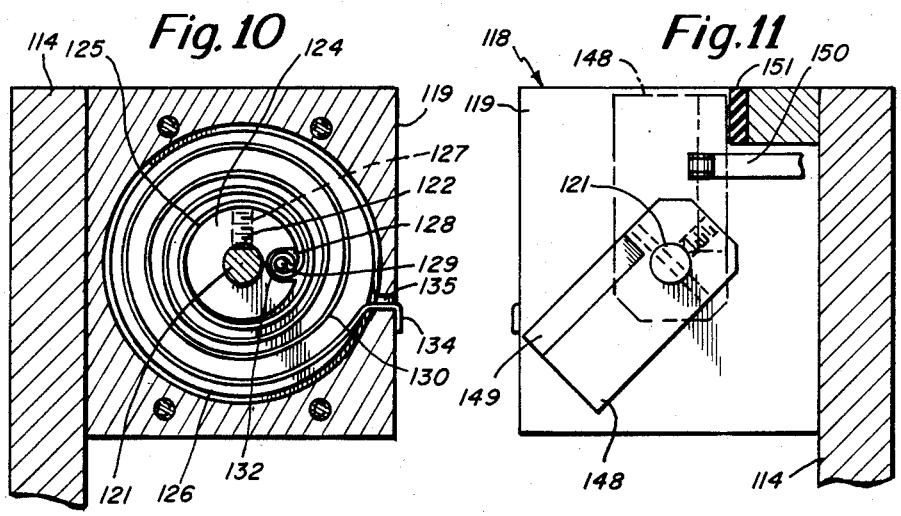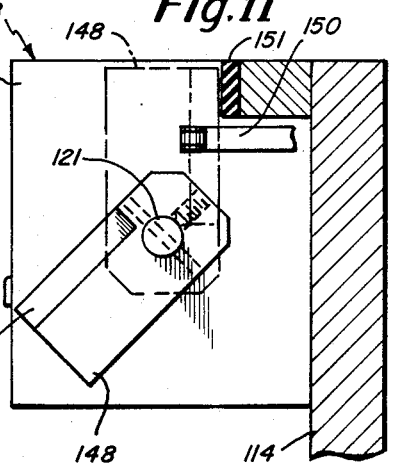

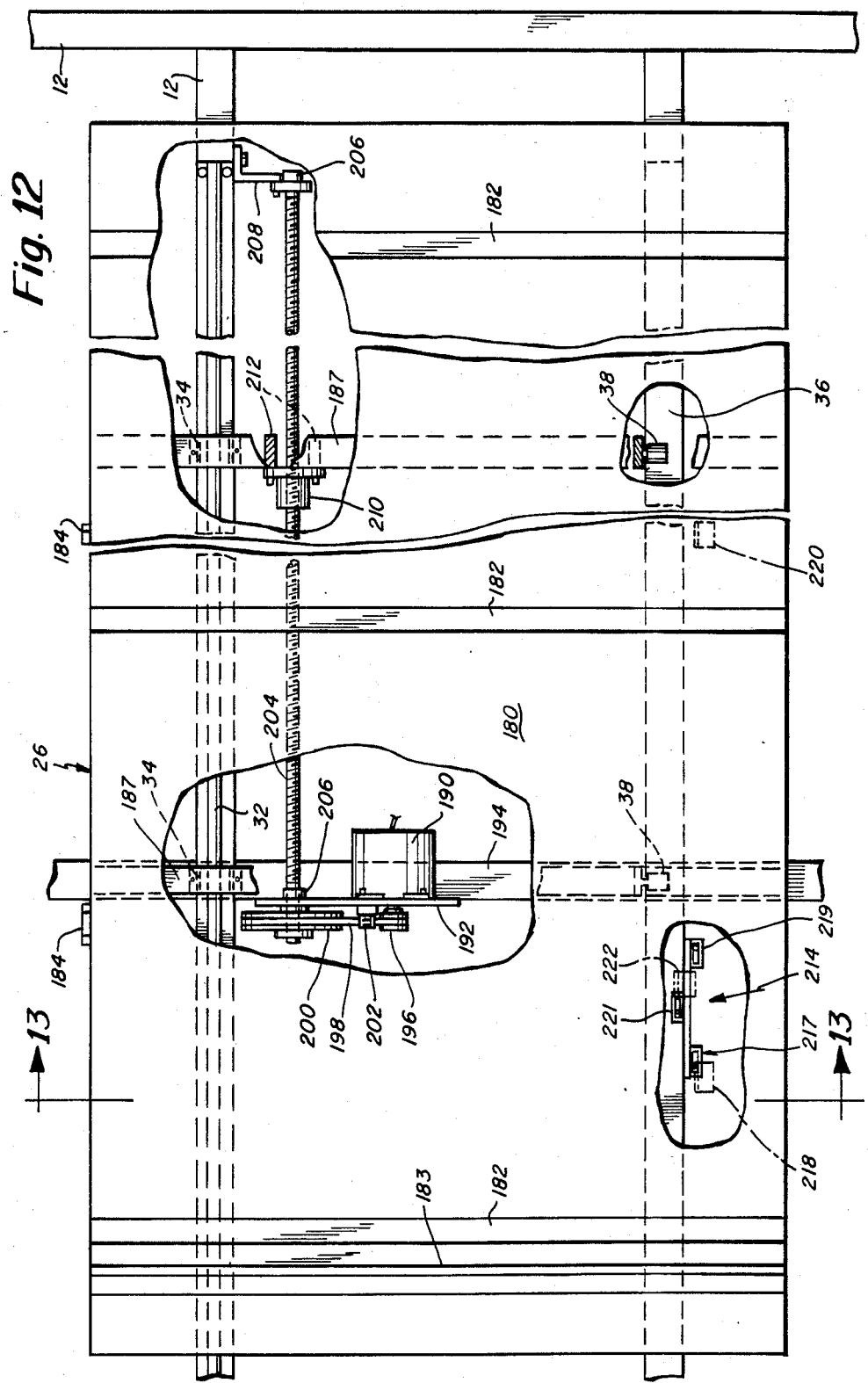

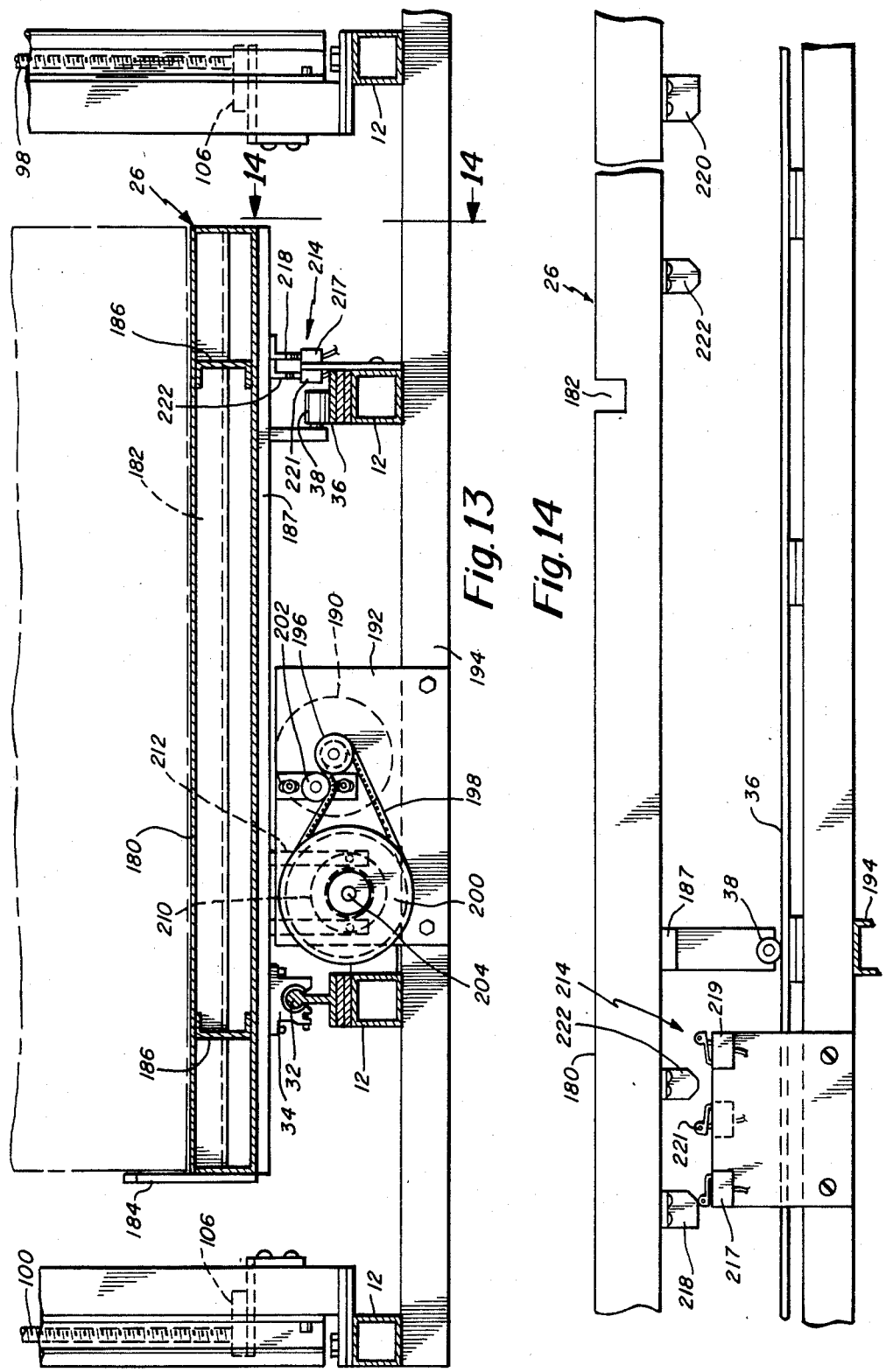

CUTTING APPARATUS

RELATED APPLICATION

This is a continuation-in-part of application Ser. No. 576,484, filed Feb. 2, 1984.

BACKGROUND OF THE INVENTION

The present invention relates very generally to an apparatus for cutting foam blocks into predetermined shapes. More particularly, the invention relates to a hot wire apparatus used to accurately cut foam blocks in a pyramidal array; the array being formed for use in conjunction with a microwave system functioning as an electromagnetic wave absorbing material. Although the apparatus of this invention is described primarily in connection with the cutting to form a pyramidal array, it is understood that the principles of the invention may also be applied in the cutting of other predetermined-shaped forms.

The machine described in application Ser. No. 576,484 is used in effectively cutting foam blocks into the desired shape for use as microwave absorbing material. However, now a number of new features have been incorporated and are now described in the new machine the details of which are set forth hereinafter.

In connection with the new features set forth herein, it is an object of the present invention to provide a more universal hot wire machine and one in which more operations can be carried out with substantial simplicity and with minimal operator involvement.

Another object of the present invention is to provide a hot wire cutting apparatus having multiple cutting wires and in which there is preferably independent drive of each of the wires.

A further object of the present invention is to provide a hot wire cutting apparatus in which the foam block support table is movable in a horizontal X axis.

Still another object of the present invention is to provide an improved hot wire cutting apparatus having an improved means for tensioning of the hot wire preferably with the use of a constant torque motor.

Another object of the present invention is to provide a hot wire machine that is operated under software control so as to enable one to use virtually any ratio of vertical-to-horizontal drive. This enables virtually any angle cut when cutting pyramidal-shaped structures.

A further object of the present invention is to provide a hot wire cutting machine having improved wire excitation control. In this regard it is preferred that the control switch associated with each wire now have multiple positions including an automatic position, an on position, and an off position also having associated therewith an indicator light.

Still another object of the present invention is to provide improved control in a hot wire machine including an emergency stop button or switch that enables an operator to stop all action and essentially shut down excitation to the wires under a malfunction condition. In accordance with the invention there is also provided a pyrometer connection which enables the machine to sense an electrical malfunction to stop operation.

Another object of the present invention is to provide a hot wire cutting machine that is operated under software control and operates so that if a wire breaks, the worker can operate the remaining wires manually at each associated switch and thus return to a home position essentially burning the way back through the foam. In this connection, in previous operation when a wire broke, it was necessary to cut through the foam in some manner in order to save the embedded wires.

In accordance with one version of the invention, it is an object hereof to provide the horizontal table with slots for accommodation of the wires, so that wires can burn down past the bottom edge of the material that is being cut. In this connection, there are also provided multiple microswitches on the table to indicate to the computer when wires are over the slots and disallows movement of the X axis of the table while the wires are below the table surface. Other table microswitches are for home (start) position, and at the far right for safety prevention of over travel of the table. Likewise, on the different axes, there are vertical limit switches, one for "home" and one to prevent wires from accidentally reaching the bottom of the slots in the table.

Still another object of the present invention is to provide a hot wire cutting machine in which the table is adapted to progress through one X axis direction with the foam in a first predetermined position and with the table then being rotatable through 90° for transitioning through a second X axis transition to cut the foam in an opposite direction thus forming the pyramidal shapes of the foam block as desired. This multiple cutting operation can be carried out with one single placement of the foam block and with the only operator involvement essentially being at the mid-point of operation and that being of rotation of the table through 90°.

SUMMARY OF THE INVENTION

To accomplish the foregoing and other objects of the present invention there is provided an apparatus for cutting a block into a structure having multiple diagonal cuts. In the preferred embodiment of the invention, the block is being cut by hot wire apparatus so as to accurately cut the foam block into a pyramidal array; the array being formed for use in conjunction with a microwave system functioning as an electromagnetic wave absorbing material. The apparatus generally comprises a frame and a table supported in the frame at a lower position of the frame. Means are provided for driving the table in a horizontal plane at a controlled speed. The apparatus is set up for handling multiple hot wires and in one embodiment, a single hot wire is employed. Means are provided for supporting the hot wire from the frame at a position over the table. The hot wire support means is driven in a vertical direction at a controlled speed. The table is supported on rail means to enable linear horizontal table transition in the frame. In accordance with another feature of the present inention, the table is preferably rotatable as well as being capable of horizontal transition. This rotation is preferably through an angle of 90°. The table is also preferably manually rotatable, although in an alternate embodiment, the table may be rotated under air or hydraulic cylinder control.

BRIEF DESCRIPTION OF THE DRAWINGS

Numerous other objects, features and advantages of the invention should now become apparent upon a reading of the following detailed description taken in conjunction with the accompanying drawing, in which:

FIG. 4 is a cross-sectional side view as taken along line 4—4 of FIG. 3;

FIG. 7 is a view taken along line 7—7 of FIG. 6 showing typical switch positions;

FIG. 8 is a view taken along line 8—8 of FIG. 6 showing further details of the mechanisms associated with the constant torque motor.

FIG. 9 is a cross-sectional view taken along line 9—9 of FIG. 8 showing hot wire attachment;

FIG. 10 is a cross-sectional view taken along line 10—10 of FIG. 8;

FIG. 11 is a cross-sectional view taken along line 11—11 of FIG. 8;

FIG. 12 is a view taken along line 12—12 of FIG. 2 showing further details of the table construction;

FIG. 13 is a cross-sectional view taken along line 13—13 of FIG. 12 showing further details of the table operation;

FIG. 14 is a cross-sectional view taken along line 14—14 of FIG. 13 showing in particular, switch actuations;

DETAILED DESCRIPTION

Figure 19:
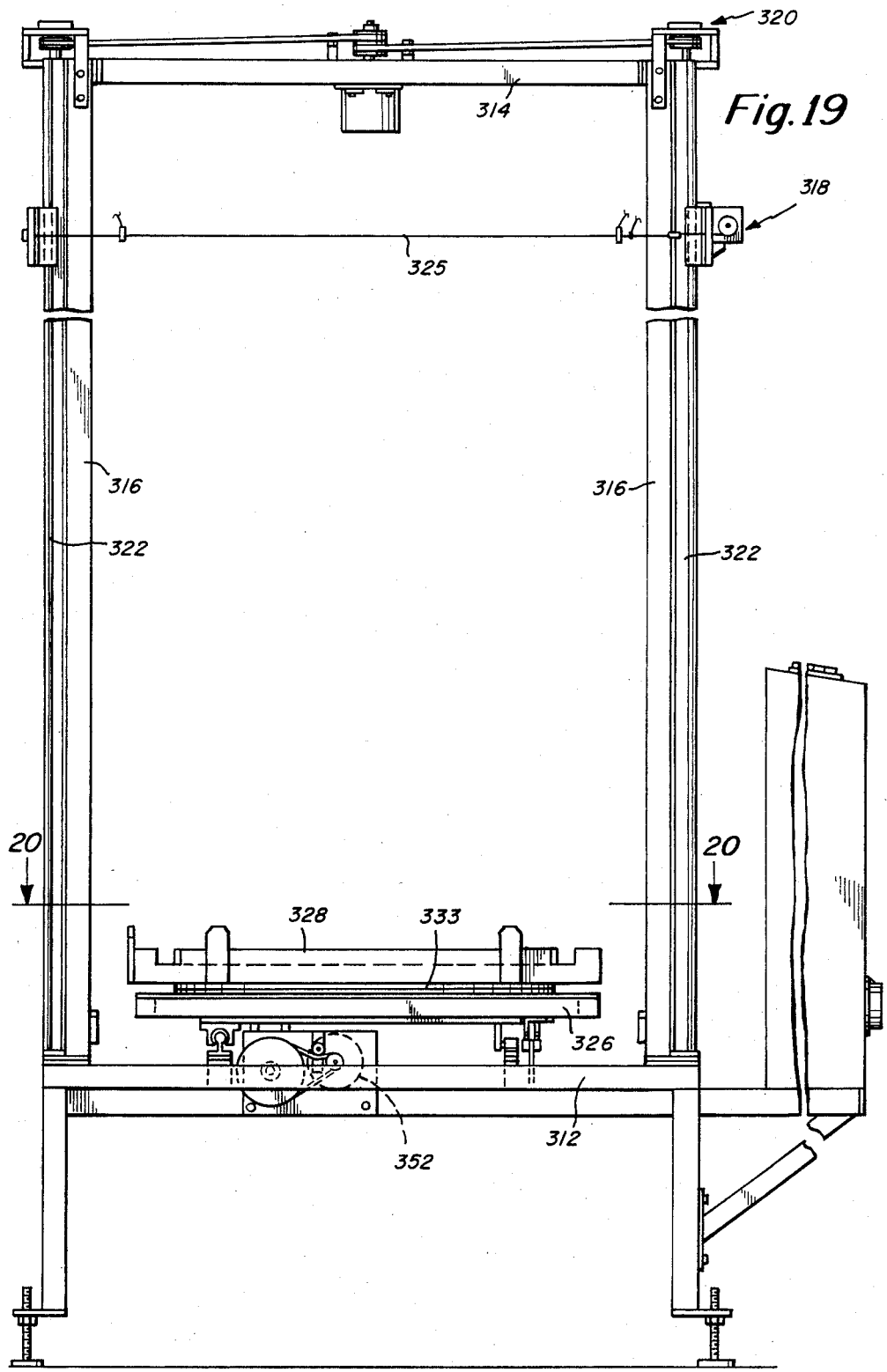
FIG. 19 is a side elevation view of an alternate embodiment of the invention employing a rotating table.
Figure 20:
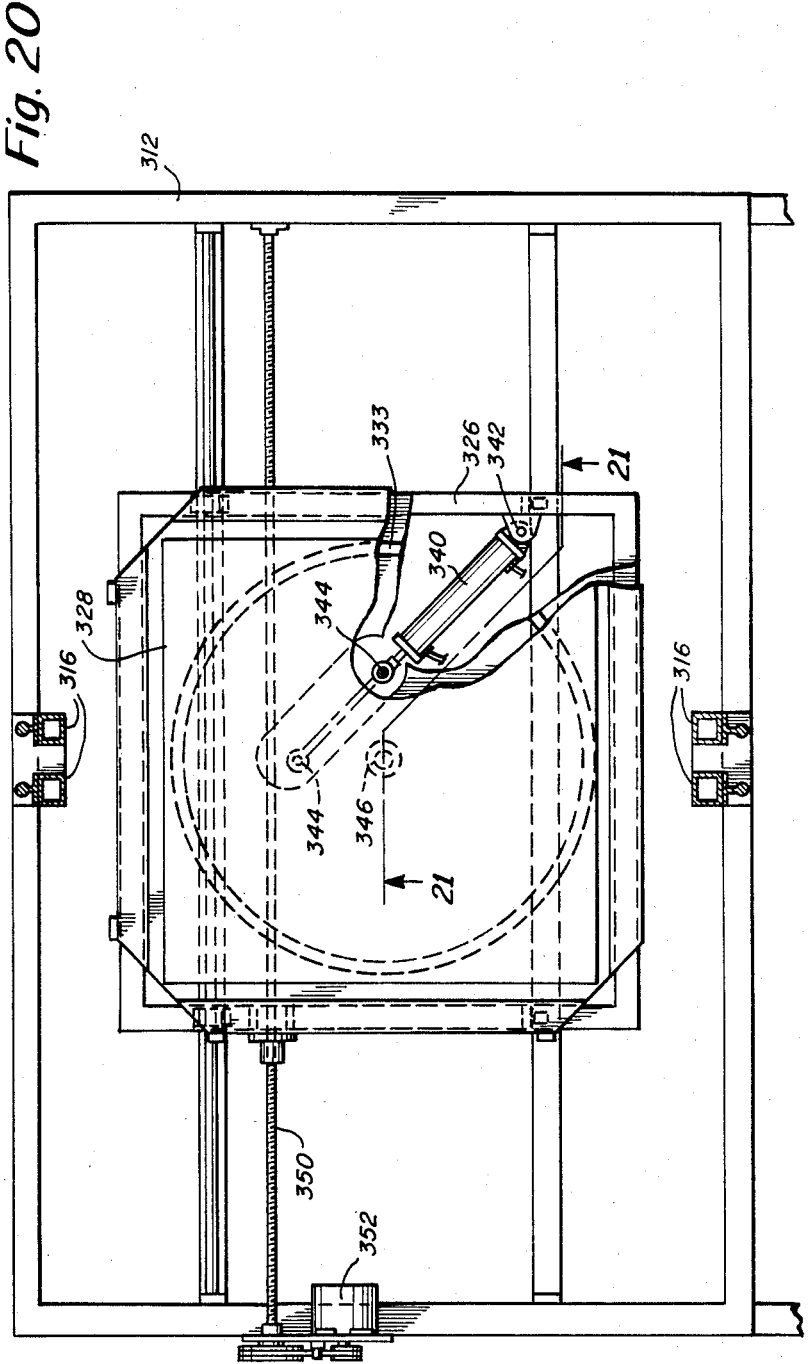
FIG. 20 is a cross-sectional view taken along line 20—20 of FIG. 19 further details of the table construction.
Figure 21:
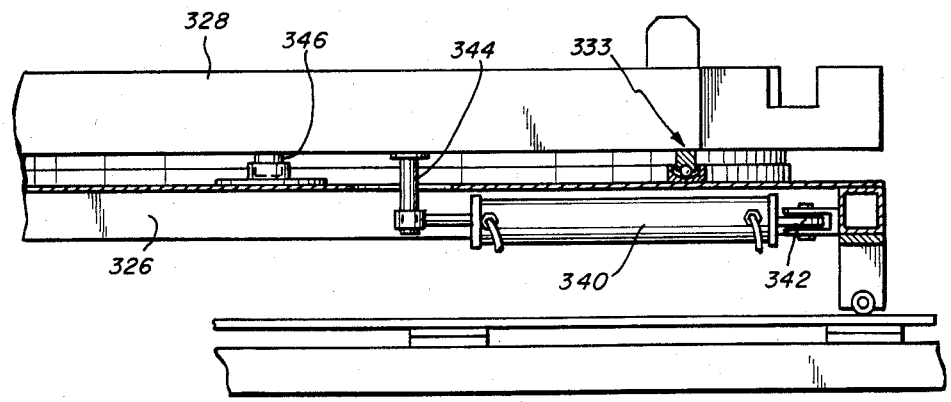
FIG. 21 is a cross-sectional view taken along line 21—21 of FIG. 20 showing further details of the rotating table construction.
Figure 22:
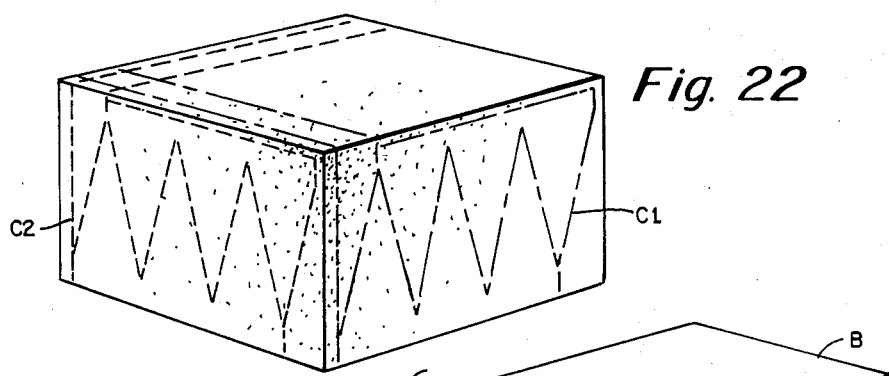
FIG. 22 is a schematic diagram illustrating the pattern of cuts carried out in accordance with the alternate embodiment of FIGS. 19-21.
Figure 23:
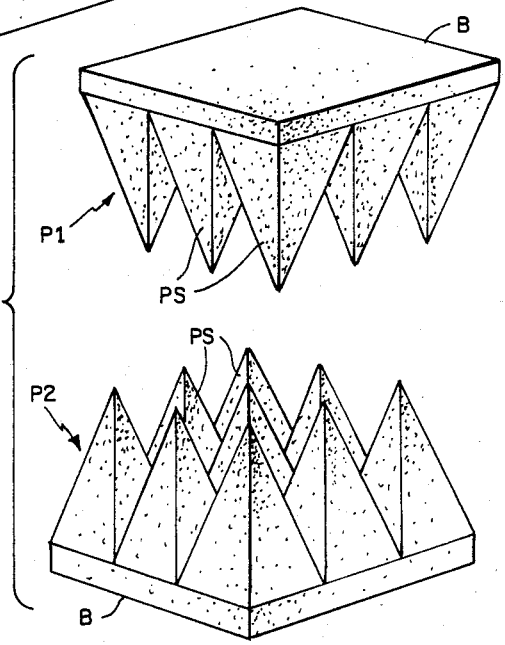
FIG. 23 is a perspective view showing the final two pyramidal-products that are formed from the cutting sequence of FIG. 22.

Reference is now made to the drawings and in this connection in FIGS. 1-14 there is shown one embodiment of the present invention. FIGS. 15-18 illustrate the block that is being cut and the different patterns of the cuts that are performed in making one block construction usable as a microwave absorbing material. An alternate embodiment of the present invention is illustrated in FIGS. 19-21 employing a rotatable table. FIGS. 22 and 23 illustrate the manner in which the block is cut in connection with the alternate embodiment illustrated in FIGS. 19-21.

Figure 1:
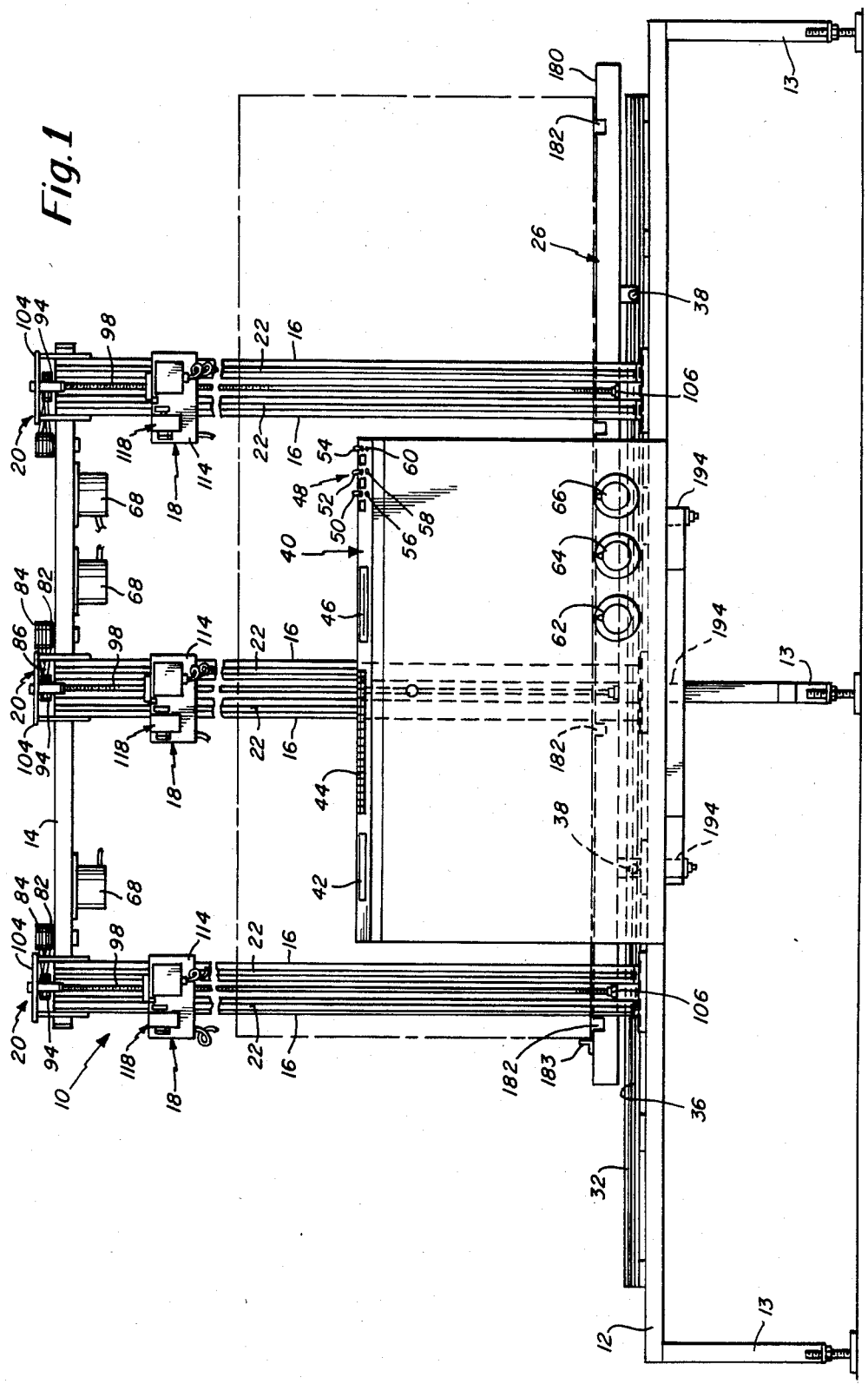
FIG. 1 is a front view of the machine of the present invention.

The hot wire cutting machine 10 generally comprises a main frame assembly which is constructed of square steel tubing welded together. This main frame assembly may be constructed of one and one-half inch square steel tubing. The main frame assembly includes a lower base frame 12 which supports the horizontal table 26. The base 12 is supported on a plurality of legs 13 which may have adjustable bottoms as illustrated in FIG. 1. The main frame assembly also comprises an upper frame 14 and vertical frame members 16. The vertical frame members 16 support the upper frame 14 and the upper frame 14 in turn supports the vertical drive motors such as the motors 68 illustrated in FIG. 1. Also note the motor 68 illustrated in FIG. 2. The vertical frame member 16 support the hot wire guide rails 22 and the hot wire mechanism illustrated in FIGS. 1 and 2 as the hot wire assembly 18.

At the top of the frame there is provided the hot wire drive assembly 20 which is operable for driving the hot wire assembly 18.

At the front of the machine, such as illustrated in FIG. 1, there is provided the operator station 40. Also note the side view of FIG. 2 which shows this operator station 40. At the operator station 40 there is provided a display screen 42, a keyboard 44, a disk drive 46 and a plurality of switches indicated at 48 in FIG. 1. These switches for control of the respective three hot wires A, B, and C, each are three position switches with positions Auto, On, and Off. In FIG. 1, these are indicated as respective switches 50, 52, and 54 associated with wires A, B, and C. There are also associated with each of these wires, indicator lights, 56, 58, and 60, respectively.

FIG. 1 also shows at the bottom of the operator station 40, three rheostats identified as rheostats 62, 64, and 66. Each of these rheostats are for respective control of the current passing through the wires A, B, and C.

In accordance with the invention, the control station also includes a control computer having software that now controls the three wires and their drives. The control of the drives for the three wires is now independent.

Figure 18:
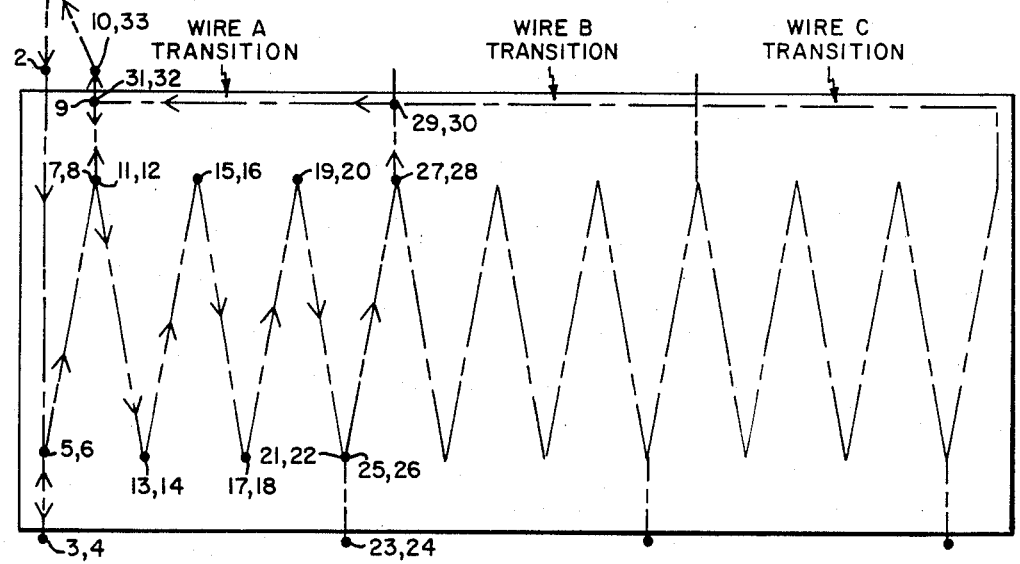
FIG. 18 is a schematic diagram illustrating the pattern of cuts in the numbered sequence.

This independent operation of the drives for the hot wires is clearly illustrated in the schematic diagram of FIG. 18. For example, in FIG. 18, the wires B, and C stay at a position corresponding to position 2, but in the wire B transition section and wire C transition section, respectively. At that position, the wires B and C are turned off while at the same time the wire A goes through a cutting sequence from steps 1-10. This cutting sequence occurs in conjunction with X axis table drive and essentially trims off the left end of the foam block. From position 10 then each of the wires A, B, and C are turned on to follow the cutting pattern illustrated in FIG. 18.

In accordance with the invention, should a wire break or go cold due to some electrical malfunction, the machine automatically stops and shuts down the excitation of the rest of the wires. This shut down can also be initiated manually by the operator. The operator can then also manually turn on each of the wires selectively and then in accordance with the computer control, initiates a "home command" and the machine returns to its home starting position. Thus, for example, if the wires are at a position corresponding say to the position 19, 20, in FIG. 18, then there could be an immediate transition back to the home position which is position 1 associated with each of the wires. This causes a burning of the wires out of the foam essentially destroying the piece but saving the wires, and also saving operator time. Previously, when a malfunction of this type occurred, one had to dig the wires out of the foam usually with a knife. Now, under manual control, the system can be brought back to a home starting position without causing further damage to the wires and this can be accomplished relatively quickly without involving long periods of operator time.

Figure 3:
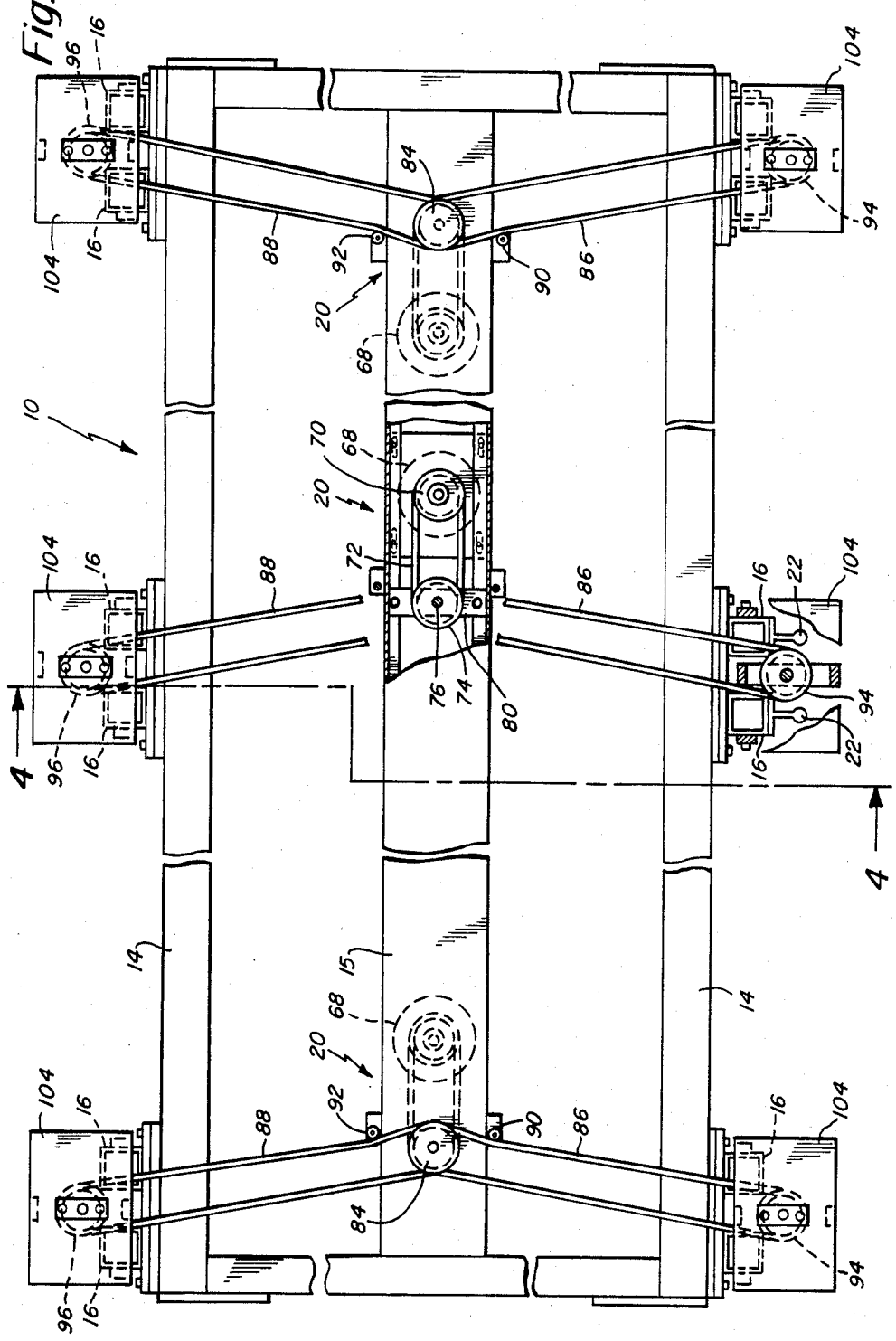
FIG. 3 is a top view of the machine of this invention.
Figure 5:
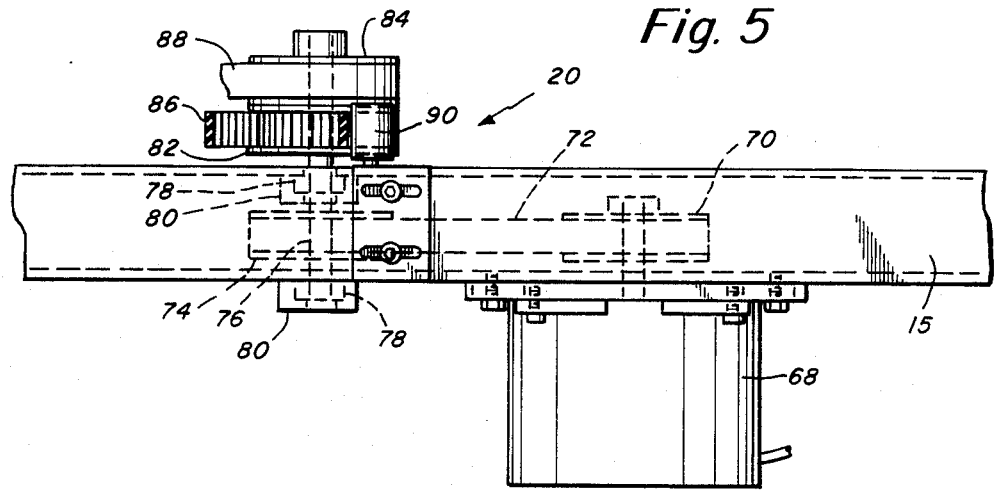
FIG. 5 is a cross-sectional view taken along line 5—5 of FIG. 4.

As indicated previously, the main frame assembly includes an upper frame 14. This is a rectangular frame and is clearly illustrated in FIG. 3. Associated with the frame 14 is a C-shaped member 15 that extends from side-to-side of the frame. The member 15 supports the drive motors and pulleys as illustrated in FIG. 3. The drive motors are the motors 68 which are mounted on plates with elongated slots and are slidably bolted to the underside of member 15. Each of the motors has an output pulley 70 which is coupled by the toothed belt 72 to a second pulley 74 which is supported on shaft 76. The shaft 76 is suitably supported in bearings 78 at opposite ends thereof. The bearings 78 are held within clamping members 80 which are bolted in fixed position to member 15. In this regard, refer to the cross-sectional view of FIG. 4. Shaft 76 at its upper end supports pulleys 82 and 84. There are provided respective belts 86 and 88 that are driven from the pulleys 82 and 84 and at the opposite end drive, the pulleys 94, and 96, respectively. Again, reference is made to FIG. 4 which shows clearly the belt arrangement and the associated drives to the outboard pulleys 94 and 96.

The tensioning of belt 72 is accomplished by sliding the motor mounting plate toward or away from pulley 74. The tensioning of belts 86 and 88 is accomplished by idlers 90 and 92 which are slidably bolted to member 15. In this regard, note FIGS. 3-5.

Figure 4:
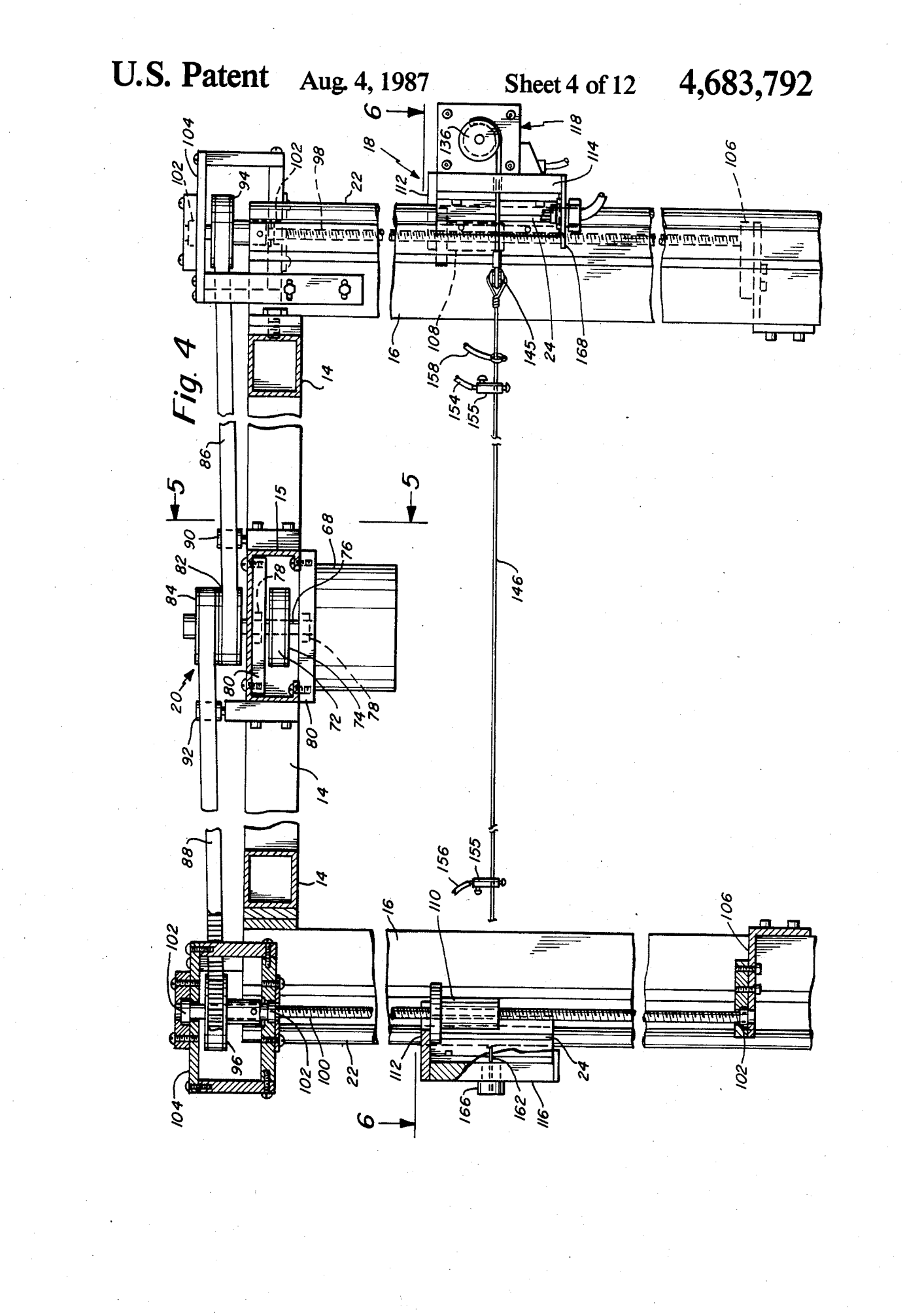

The pulleys 94 and 96 are supported in brackets 104 as illustrated in FIG. 4. The brackets 104 are the top supports for the ball and screw drive shafts 98 and 100. The shafts 98 and 100 are supported at their top end by a bearing 102. Similarly, at the bottom of these shafts there is a support bracket 106 associated with each of the shafts and this also supports a bearing 102 for the drive shafts 98 and 100. The brackets 106 are bolted to the vertical frame members 16. Thus, with the operation of this motor drive and pulley and belt arrangement, the shafts 98 and 100 are turned at the same rate by the motor 68.

As indicated previously, the shafts 98 and 100 are essentially in the form of lead screws and as such, the shafts 98 and 100 pass through ball bearing nut followers 108 and 110, respectively. These followers follow the turning screws up or down depending upon the direction of rotation.

The drive arrangement is substantially the same for either of the drive screws 98 or 100. However, the front arrangement drives the constant torque motor end of the hot wire as illustrated in FIG. 4 while the rear arrangement drives the anchored end of the wire.

The followers 108 and 110 are mounted each on plates 112 which are U-shaped to allow passage of the corresponding lead screw. The plates 112 are bolted to plates 114 and 116 which are slidably mounted on parallel rails 22 to either side of the screw. Slides 24 are bolted to plates 114, 116 and the slides each have associated therewith an adjustment means 25 which enables precise sliding action. With regard to the slide and rail operation, reference should be made to FIG. 6 which best illustrates the set screw adjustment 25 to reduce lash, or friction between the slide assembly and rail.

Figure 6:
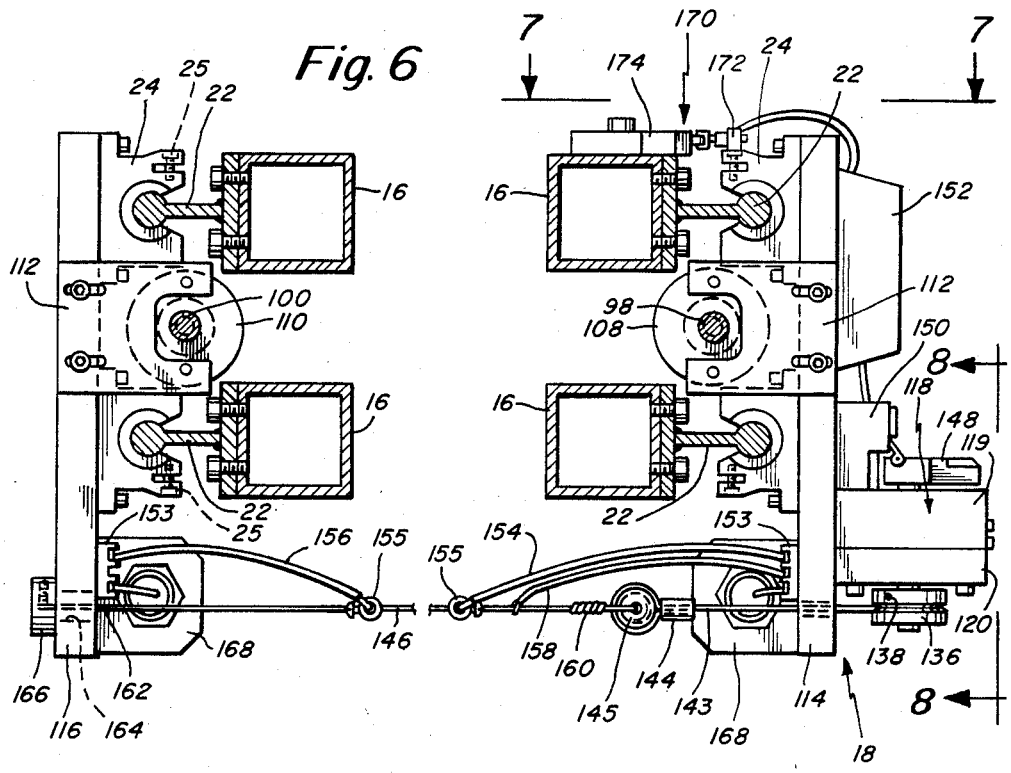
FIG. 6 is a cross-sectional top view taken partially down the machine as indicated along line 6—6 of FIG. 4.

The constant torque motors 118 illustrated previously in FIGS. 1 and 2, and also now shown in FIG. 6, are attached to plates 114. The torque motors 118 comprise a main housing 119 which is bolted directly to the plate 114. The main housing has a circular cavity as illustrated in FIG. 10. This cavity is adapted to house the wire spindle 124 and also contains coil springs 130. The springs 130 may be of the same type as used in a chain saw starter cord as a return spring manufactured by Husquarna. Each of these springs have a force of 5 lbs. and therefore two are used to achieve the proper 10 lbs. of force on the wire.

The spindle 124 has a separating flange 126 to keep the springs from hanging up in each other. There is also a reduced diameter 125 which fit inside the inner diameter of the coil springs 130. FIG. 10 also shows the indent 128 with an associated pin 129 passing therethrough. The pin 129 is passing through the middle of the indent and pressed into a hole through the flange 126. The inner ends of the coil springs 130 have a closed loop 132 which is placed over the pin 129 to anchor the inner ends of the springs to the spindle. The spindle 124 has two set screws 127 (see also FIG. 8) passing through shoulders 125 and engaging the flat 122 on shaft 121. Shaft 121 is set in two bearings 123 shown in FIG. 8 supported in the main housing and cover. At the left end of the shaft 121 as seen in FIG. 8, there is the wire pulley 136 which is attached to two set screws 138 to the shaft 121. In this regard, also refer to the cross-sectional view of FIG. 9 which shows the set screws 138. The wire pulley and main housing and cover may all be aluminum construction.

As illustrated in FIG. 8, the pulley 126 has a V-shaped groove 137 around its circumference to accommodate the braided steel wire 141. The wire 141 as illustrated in FIG. 9 is anchored in hole 139 which is drilled through the V-groove 137 slightly off-center to miss the shaft 121 as clearly illustrated in FIG. 9. The very end of the wire 141 is held in place by set screw 140 at the end 142 of the wire. The braided wire 141 then passes through the clearance hole 147 in plate 114 and is attached at its far end 143 to the wire insulator 145. The insulator 145 has a groove that is semi-circular in cross-section and which is adapted to center the wire 141 about its circumference. The insulator 145 has a hole drilled through its center to accommodate the hot wire. The insulator 145 is preferably plastic. The wire stop 144 is used to clamp the wire 141 about the circumference of the insulator 145. As noted in FIG. 9, the hot wire 146 is passed through the central hole and twisted about itself at end 160 so it is held in a space relationship from the wire 141.

FIG. 4 shows the hot wire 146 along with the insulator 145 and the pulley 136 operated from the constant torque motor 118. The far end 162 of the hot wire is also illustrated in FIG. 4 as being anchored in insulator 166. Also refer to FIG. 6 which shows the far end 162 of the hot wire 146 passing through the clearance hole 164 in plate 116 and anchored in insulator 166 by means of a set screw.

The electrical connections to wire 146 are provided by means of conductor wires 154 and 156 such as illustrated in FIGS. 4 and 6. The wires 154 and 156 are secured to the hot wire 146 at the proper space relationship as illustrated in FIG. 4 by means of the clamps 155. The clamps 155 are of the same type described in the aforementioned application Ser. No. 576,484. Wires 154 and 156 are connected to terminal blocks 153 and then to coiled wires held by strain reliefs fixed in plates 168.

At the other end, they couple into the console operator station 40.

FIGS. 4 and 6 also show the pyro wire 158 which is attached by thermocouple to wire 146. The wire 158 is a sensing wire and is used to determine the existence of a cold wire. This condition then triggers an emergency stop condition. If on the other hand there is the breakage of a wire, then this is detected by the switch 150 such as illustrated in FIGS. 8 and 11.

The switch 150 is mounted on stop 151 with a rubber bumper to absorb the shock of spring tensioned shaft 121 rotating the shaft lever 148 against it. The lever 148 has a ramp 149 as shown in FIGS. 8 and 11 which contacts the arm of the microswitch 150. In FIG. 11, if wire 146 should break, the shaft 121 rotates in turn causing rotation of the arm 148 in a counter clockwise direction under spring pressure until it closes the microswitch 150 and hits the stop 151. In FIG. 11, the arm 148 is shown in solid in its normal position and is shown in phantom outline in a position relating to a broken wire.

FIGS. 6 and 7 illustrate the vertical limit switch assembly 170 which is mounted adjacent the slide 24. The limit switch assembly 170 generally includes a home limit switch 172 and an override switch 176. The switch 172, as noted in FIG. 7 is mounted over the switch 176. The upper switch 172 contacts the trip piece 174 when plate 114 has reached its home position and is a manual double check with the software of the system, to assure proper alignment after the conclusion of a run. This switch also serves as a safety override in the event that the computer control maintains the sending of pulses to the drive motor.

The override switch 176 has associated therewith a lower limit trip piece 178 which insures that the drive stops with the wire one half inch below the table surface in the center of a one inch deep slot in the table. Both of these switches are wired into the box 152 on plate 114 and then coupled by coiled cable to the console 40. The box 152 is shown on the left side of FIG. 7.

Figure 2:
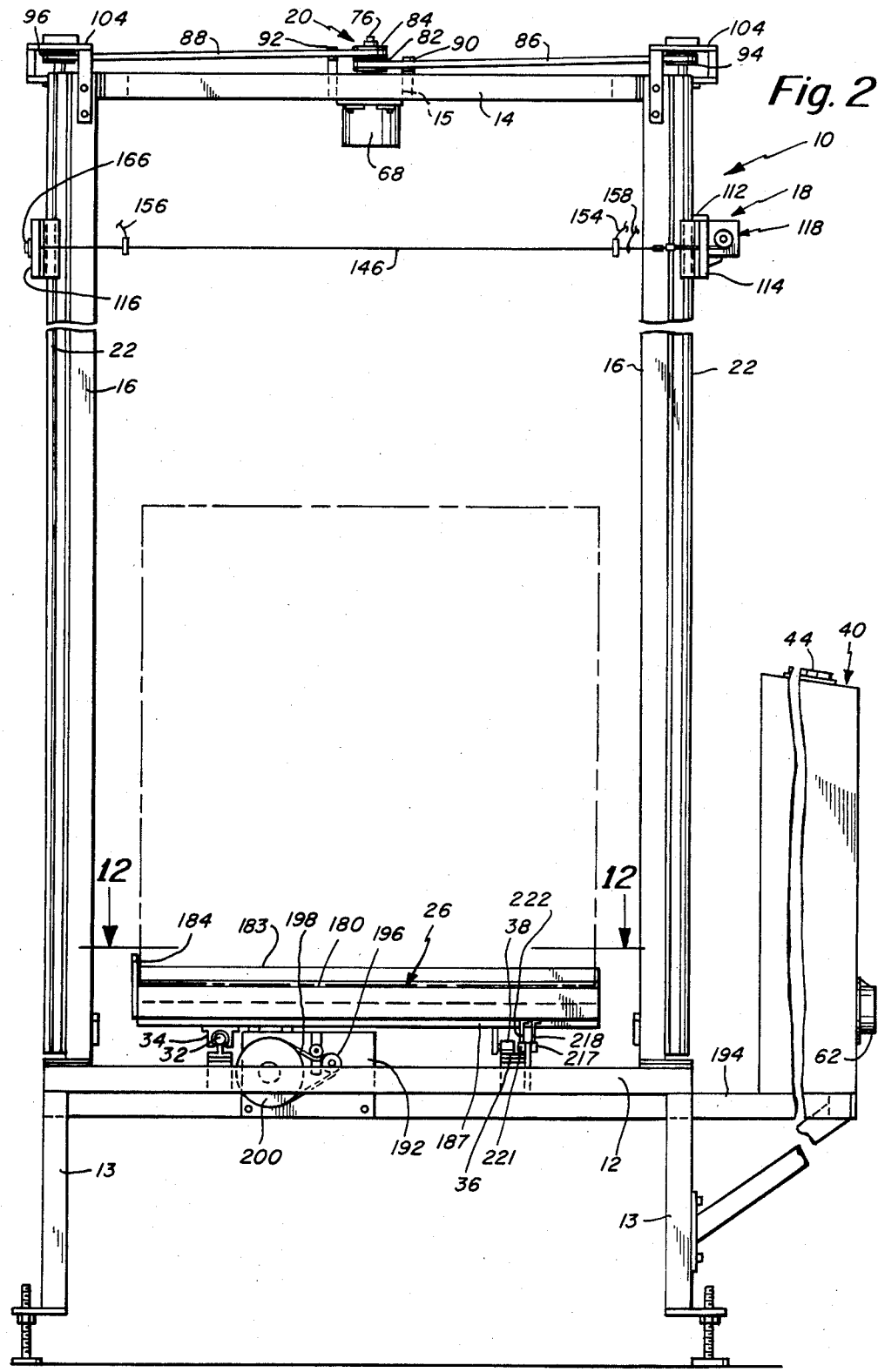
FIG. 2 is a side elevation view of the machine of FIG. 1.

Reference is now made to FIG. 12 which is a view taken along line 12—12 of FIG. 2 showing further details of the table that is employed. The table 26 is slidably fixed on rails 32 by means of slides 34. The slides 34 are bolted to stiffeners 187 which run crosswise to the underside of the table. Also, refer for details to FIG. 2 and FIGS. 13 and 14. The table 26 may be constructed of aluminum with steel channel stiffeners 186. Because of the thermal expansion of the table and the relatively wide width of the table, instead of employing a second rail and slide assembly, there is instead used a parallel flat tail 36 on which two rollers 38 run and these are also attached to stiffeners 187. This arrangement is used to reduce binding problems.

The rails 32 are bolted to frame 12 with spacers. The horizontal drive motor 190 is attached to a plate 192 which is in turn bolted to the cross brace 194. The brace 194 is welded crosswise to frame 12 and at its front end also supports the console 40.

The motor 190 supports a tooth pulley 196 which in turn drives the belt 198 which couples to the pulley 200. In this connection, note FIGS. 12 and 13. FIG. 13 in particular also illustrates the use of the idler 202 which takes up any slack in the belt 198. The pulley 200 which is larger than the pulley 196 is fixed on one end of the screw shaft 204 illustrated in FIG. 12. The shaft 204 is supported in bearings 206 at opposite ends thereof. The bearing 206 at the left end is supported by plate 192 and the bearing at the right end is supported by bracket 208 which is bolted to the frame 12. At an intermediate position of the screw shaft 204 there is provided a follower 210 which is bolted to fork 212 which in turn is welded to the stiffener 187.

Slots are provided in the top of the table such as the slots 182 illustrated in FIG. 12. These slots enable, in one embodiment, the hot wire to make a through-cut at the bottom of the foam block without hitting the table. FIG. 12 also illustrates the stop 183 which may be an angle iron across one end of the table to align the foam block. Also note the stops 184 which can also be used for alignment.

Associated with the table 26 is a microswitch array 214 referred to in FIGS. 12 and 14. The array 214 includes switch 217 with associated trip 218 which is engaged for home position and also functions as an emergency override to avoid over travel and home registration with the software. There is also illustrated a switch 219 which should never hit the trip 220 unless software malfunctions and the table tries to over travel. This is thus providing a safety override feature. Switch 221 is a third switch of the switch array and is triggered by the trip 222 at the end of step one. This switch centers the wire A directly over the first slot 182 at the left end of the table for the first trimming cut. It allows the wire A to drop below the surface of the table by one-half inch into the slot for a through-cut. The second trip 222 contacts switch 221 at the end of step 21 in the program (refer to FIG. 18) and allows all three wires to drop into grooves 182 for through-cuts.

Figure 15:
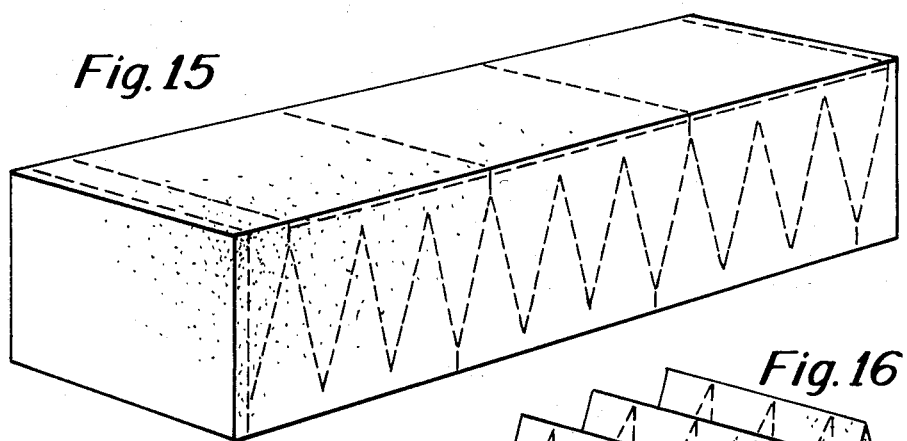
FIG. 15 is a perspective view showing a foam block and indicating in dotted outline where the first cuts are to be made.

FIG. 15 shows one form of the foam block that is initially started with and illustrating in dotted outline the first set of cuts that can be made employing three wires referred to hereinbefore as wires A, B, and C. In this regard, reference may also be made to FIG. 18 which shows a similar side view illustrating the three areas where the respective wire cuts are made, referred to in FIG. 18 as wire transition areas.

Figure 16:
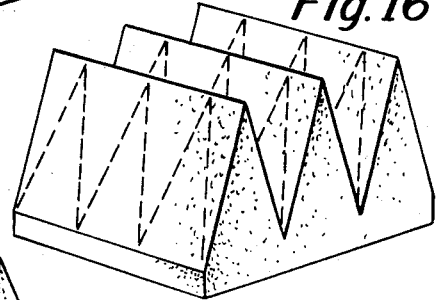
FIG. 16 is a perspective view of one of the six smaller blocks that is cut by virtue of the first cutting operation illustrating also in dotted outline, the second cutting pattern that is to be performed.
Figure 17:
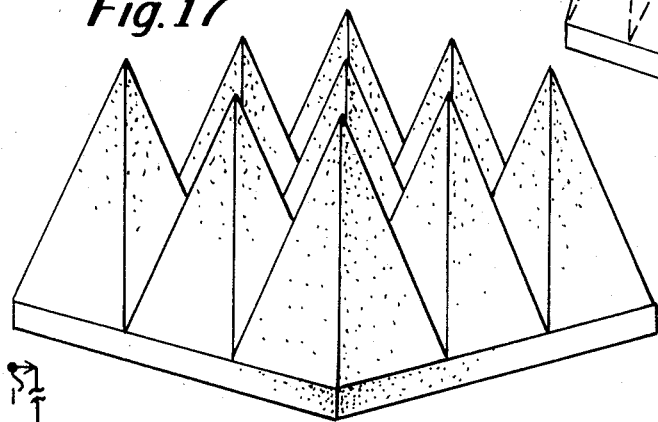
FIG. 17 is a perspective view showing the final foam product with all of the cuts having been completed.

FIG. 16 shows one of the smaller of six blocks that are cut from the larger block of FIG. 15. It is noted in FIG. 15 that when the cutting operation is completed, the larger block is actually separated into six smaller blocks, each of the size and shape illustrated in FIG. 16. FIG. 16 also has shown in dotted outline, the cuts that will be made essentially in the opposite direction to carry out the second cutting sequence. The second cutting sequence, once completed, provides the block construction as illustrated in FIG. 17 which is the desired configuration for application in microwave absorption.

In the schematic diagram of FIG. 18, there is shown a numbered sequence of operation, at least with regard to the wire A transition. This includes an initial cut between steps 1 and 10 that essentially sections off the very left end of the block in FIG. 18. During that cutting sequence only wire A is activated. At the end of that sequence at position 10, then likewise in wire transition areas B and C, the wires B and C are also at corresponding positions 10 and these may be considered as the home positions, from which the actual sequence of cutting steps commences. Each of the sequences then start from position 10 and follow the diagonal cuts shown returning by way of positions 29 and 30 back to the home position which is also numbered 33 to indicate the end of the sequence. The same type of cutting sequence also occurs for the transition B and transition C sections of the block.

Thus, in the operation of the machine of this invention in accordance with one mode of operation, the block of FIG. 15 is first placed on the table and is properly positioned abutting the block against the stops 183 and 184. The program is then operated in a "run" mode and the block is cut in the manner illustrated in FIG. 18 with the capability of selective drive for each of the wires. This also involves of course, selective excitation of the wires. It is preferred that the hot wires only be excited when necessary for cutting. Once the initial sequence as outlined in FIG. 18 has been completed, then the individual blocks or even a row thereof, may again be placed on the table essentially rotated through 90° in their placement from the original cutting and then the program is actuated to provide the cuts as indicated by dotted outline in FIG. 16. The diagonal cutting arrangement in either sequence is accomplished by virtue of movement of the table in the X-direction along with the transition of the wires in the Y-direction or vertically. Because the vertical transition is accompanied by the horizontal movement of the table, then a diagonal cut is thus formed.

It has been mentioned previously that in order to complete the cutting of the foam blocks, the blocks require rotation manually through 90°. However, in an alternate embodiment as illustrated in FIGS. 19-21, the table can be constructed so that it is rotatable through 90°. In this way the blocks need not be repositioned for the second cutting, but instead, the table is simply rotated through 90° after the first cut is made and then the second sequence of cutting is carried out.

In accordance with one embodiment, only a single hot wire has been used rather than the multiple hot wire construction illustrated in the first embodiment. Furthermore, the first cutting sequence is such that, with reference to FIG. 18, basically only the diagonal cuts are made and this thus means that the table can progress at a substantially constant speed while the vertical drive goes up and down to create the diagonal cuts. There are no cuts that go through the block and thus the block is not separated into pieces after the first cut. The table is then rotated through 90° and substantially the same cuts are then made in the opposite direction. The block that is used can be made square so that the same number of cuts occur in both directions. This makes the programming easier so that essentially the same program steps are used for both cutting sequences. This thus leaves a relatively large block with several pyramidal shapes as illustrated in FIG. 17. This large block can then easily be sectioned into separate blocks as in the nine pyramid arrangement of FIG. 17.

With regard to the embodiment of FIGS. 19-21, the construction of most of the machine is substantially identical with that previously described and thus there are provided vertical frame members 316 and an upper frame 314 along with a base frame 312. FIG. 19 also shows the torque motor 318 for maintaining a predetermined torque on the hot wire 325. As indicated in this particular embodiment for use with the rotating table, a single wire may be employed, although in alternate embodiments even with the use of a rotating table multiple wires could be employed.

FIG. 19 also shows the table drive motor 330 which is substantially the same as the motor previously described. As a matter of fact, the table 326 is supported on rails for X-direction transition in the same manner as in the earlier embodiment. The primary difference in accordance with the alternate embodiment is in the fact that the table is essentially in two parts also including an upper table section 328 that is rotatable relative to the bottom table section 326. In this connection, also refer to FIG. 21 which shows the use of a peripheral bearing 333 which permits rotation between the two table segments. The rotation of 90° may be carried out by the use of an air or hydraulic cylinder such as the cylinder 340 shown in FIGS. 20 and 21. One end of the cylinder 340 is essentially secured at 342 so that this end is maintained stationary on the slidable table. The other end of the cylinder 340 is secured to a pin 344 which is off-center from the spindle 346 supporting the upper table section 328. This off-center arrangement enables a 90° rotation of the table 328. In this regard, in FIG. 20, the position of the cylinder is shown in solid in one position and is also shown in dotted with the cylinder in its extended position causing the table to rotate through the aforementioned 90°. It can be seen in FIG. 20 that the position of the pin 344 in the two alternate positions is displaced 90° relative to the spindle 346.

FIG. 20 also clearly illustrates the manner in which the table is supported on the rails. FIG. 20 also illustrates the lead screw 350 and associated X-axis direction drive motor 352. The pulley and belt arrangement associated with the motor 352 is substantially the same as described in connection with the earlier embodiment. Thus, the table is set for operation in the X-direction in the same manner as discussed previously, but now is also capable of 90° rotation. This 90° rotation can be accomplished by way of computer control, or alternatively can be under manual control.

Also, in accordance with still another embodiment of the present invention, the table may simply be in the form of a rotatable table that is adapted to be interlocked in one of two different 90° positions. These positions can be rotated between under manual control with the use of some type of a detent arrangement with some associated interlocking at the two 90° positions. This would not even require the use of any hydraulic or air cylinder. In the embodiment of FIGS. 19-21, there may also be provided the microswitch assembly described previously in connection with FIG. 12. For the sake of simplicity, this has not been illustrated in the second embodiment, but would be incorporated therein in actual version.

Now, in connection with the embodiments illustrated in FIGS. 19-21, reference is made to the diagrams shown in FIGS. 22 and 23. In FIG. 22, there is illustrated the sequence of cuts in association with the embodiment in which the table is rotated through 90°. In this connection, it is noted that the block in FIG. 22 is a cube or substantially of cubic shape. This block is placed on the table and is caused to be cut in a first cutting sequence shown in solid in FIG. 2 by the cut C1. This cutting sequence is similar to the sequence illustrated in FIG. 18 for a single wire. It is noted that in the cutting sequence of FIG. 22 it is assumed that only a single wire is used for carrying out the cutting operation.

After the cutting sequence has been completed in connection with the cutting pattern C1, then the table is rotated through 90° and the cutting pattern C2 is followed as illustrated in FIG. 2.

FIG. 23 illustrates the two separate products P1 and P2 that are eventually formed by virtue of the cutting sequences illustrated in FIG. 22. This essentially forms two substantially identical products, each having a base B and having a number of pyramidal-shaped projections PS extending therefrom as illustrated.

In connection with the control of the present invention as far as the cutting sequences are concerned such as in FIGS. 22 and 23, reference may also now be made to table 1 enclosed herewith showing the program for carrying out the cutting sequences noted.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. Apparatus for cutting a block into a structure having multiple diagonal cuts forming a uniform array of pyramidal-shaped projections and comprising;
   a frame,
   a table supported in the frame at a lower position of the frame,
   means for driving the table in a linear horizontal direction at a constant controlled speed during a diagonal cut,
   at least one cutting hot wire,
   means supporting the hot wire from the frame at a position over the table,
   and means for driving the hot wire support means in a linear vertical direction at a constant controlled speed during a diagonal cut,
   said table including a platform upon which the block is retained and a table support,
   said platform being rotatable relative to said table support as well as being moveable in a linear horizontal direction along with said table support.

2. Apparatus for cutting a block as described in claim 1 wherein said table is supported on rail means to enable linear horizontal table transistion in the frame.

3. Apparatus for cutting a block as described in claim 1 including mechanically-operated means for rotating the platform.

4. Apparatus for cutting a block as described in claim 3 wherein the platform is rotatable through an angle of 90°.

5. Apparatus for cutting a block as described in claim 4 wherein the platform is manually rotatable.

6. Apparatus for cutting a block as described in claim 4 wherein the platform is rotated under air or hydraulic cylinder control.

7. Apparatus for cutting a block as described in claim 1 including means for supporting a plurality of hot wires including separate and independent drive means for each hot wire.

8. Apparatus for cutting a block as described in claim 1 wherein said means for driving the table includes control means for driving the table in a first direction through a first cutting sequence followed by rotation of the table and subsequent driving of the table in an opposite direction.

9. Apparatus for cutting a block as described in claim 1 wherein said table is supported on rail means to enable linear horizontal table transition in the frame and wherein said means for driving the table comprises drive motor means.

10. Apparatus for cutting a block as described in claim 9 wherein said means for driving the table further comprises lead screw means driven by said drive motor means.

11. Apparatus for cutting a block as described in claim 1 wherein said hot wire support means comprises a fixed support at one end and a torque support at the other end.

12. Apparatus for cutting a block as described in claim 11 wherein said torque support comprises a torque motor for hot wire support.

13. Apparatus for cutting a block as described in claim 12 including means coupled to said hot wire for detecting the temperature thereof including a pyrowire.

14. Apparatus for cutting a block as described in claim 1 wherein said means for driving the hot wire includes means for driving the support means thereof at a constant speed and only in one non-oscillatory vertical direction in the frame relative to the table and orthogonal to the direction of table drive during a cutting step.

15. Apparatus for cutting a block as described in claim 11 including switch means responsive to hot wire tension.

16. A method of cutting foam blocks into predetermined sloped patterns forming a uniform array of pyramidal-shaped projections, said method comprising the steps of; supporting the block on a table in a framework, providing a means to carry at least one hot wire disposed over the table and spaced from the table in a precutting position of the hot wire, providing linear drive to the table to cause the table to move linearly at a constant speed in only one horizontal direction during a first cutting sequence, providing linear drive to the hot wire so as to move the hot wire linearly at a constant speed in only one vertical direction during the first cutting sequence, controlling the table and hot wire drives to provide product cutting along a predetermined diagonal path including simultaneous drive at relative constant speeds to control the shape of the diagonal cut and thus the shape of the pyramidal-shaped projections, rotating the table and thus the block through an angle of approximately 90°, and cutting the block in a second cutting sequence so as to ultimately form the pyramidal-shaped projections in the block.

* * * * *